Oct. 29, 1929.  E. N. ERICSON  1,733,657
CUTTER
Filed Feb. 4, 1927
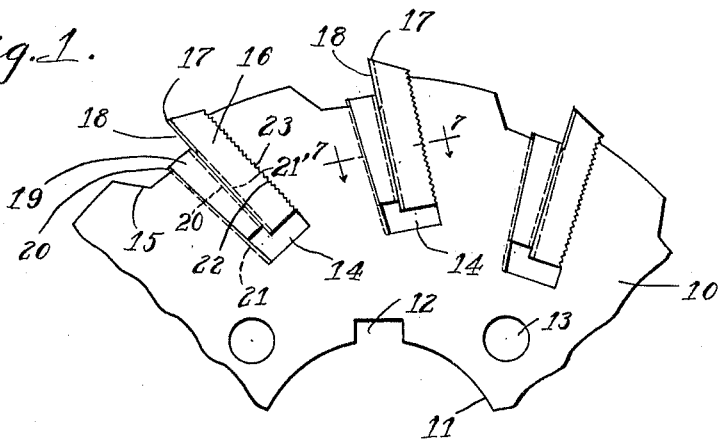
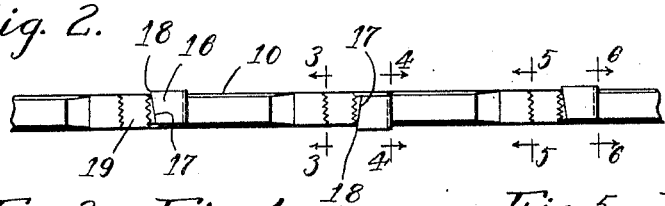
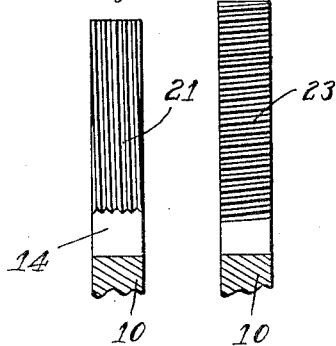
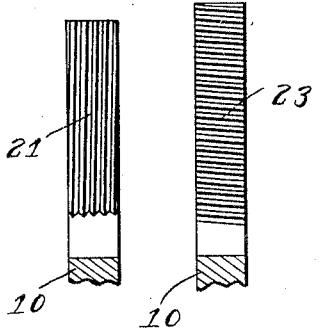
Inventor:
E. Norman Ericson
By Wilson & McCanna
Attys.

Patented Oct. 29, 1929

1,733,657

UNITED STATES PATENT OFFICE

E. NORMAN ERICSON, OF ROCKFORD, ILLINOIS, ASSIGNOR TO THE INGERSOLL MILLING MACHINE COMPANY, OF ROCKFORD, ILLINOIS, A CORPORATION OF ILLINOIS

CUTTER

Application filed February 4, 1927. Serial No. 165,848.

This invention relates to cutters for general use and has particular reference to an inserted tooth cutter of improved construction and design whereby both endwise and sidewise adjustment of the cutting teeth may be made with facility and whereby the teeth are positively locked in position when set.

According to my invention, an inserted tooth cutter such as is ordinarily used for milling or slotting operations is provided having the teeth set in slots opening into the periphery of the cutter body and arranged to be locked in place by wedges inserted in the slots alongside the same, the wedges having longitudinal serrations to interlock with serrations extending lengthwise of the one side of the slots and the teeth therein, while the teeth have transverse serrations on the back thereof to interlock with corresponding serrations on the other side of the slots. By virtue of this arrangement the teeth may be adjusted in and out or from one side to the other and locked securely in any desired state of adjustment, the transverse serrations serving to prevent endwise displacement while the longitudinal serrations serve to prevent lateral displacement.

An additional feature in connection with the longitudinal and transverse serrations consists in having the transverse serrations inclined in a predetermined relation to the cutting edge of the tooth either to facilitate the adjustment of the tooth after the same becomes worn, or to resist the thrust imposed upon the tooth in cutting the stock. In any event the longitudinal serrations are arranged substantially in right angular relationship with the transverse serrations so that the driving home of the wedge will not possibly change the adjustment of the tooth.

These and other features of the present invention will be brought out in the course of the following detailed description having reference to the accompanying drawings, wherein—

Figure 1 is a fragmentary side elevation of a milling cutter provided with inserted teeth in accordance with my invention;

Fig. 2 is a plan view of Fig. 1;

Figs. 3 and 4 are enlarged transverse sectional details taken on the lines 3—3 and 4—4 of Fig. 2 to show the longitudinal and transverse serrations provided on the opposed sides of a given slot;

Figs. 5 and 6 are similar views showing the serrations provided in the next slot, alternate slots having the serrations inclined one way while intermediate slots have the serrations inclined the other way; and Fig. 7 is an enlarged sectional detail taken on the line 7—7 of Fig. 1.

The same reference numerals are applied to corresponding parts throughout the views.

The invention is illustrated as applied to a simple type of milling cutter such as is adapted for the cutting of keyways, slots and the like but it will be apparent that no limitation is to be imposed on the application of the invention by reason of the illustration of this particular type of cutter as the present improvements are capable of application to practically any type of cutter having inserted teeth. Also there is no limitation in the application of the invention to a cutter having either peripheral or side cutting edges as either one or both may be employed so far as this invention is concerned.

The cutter comprises a body portion 10 having a center hole 11 whereby the cutter may be mounted on an arbor and having also a keyway 12 for the reception of a drive key provided on the arbor. The openings at 13 permit the mounting of the cutter body on the usual collars. A plurality of slots or recesses 14 are milled into the body from the periphery thereof, the body being of any suitable steel to permit of this and other machining operations thereon and also to make for economy. The slots open at the periphery adjacent the relieved portions 15 which afford ample chip clearance in front of the teeth 16 inserted in the slots. The teeth are produced suitably from high speed steel and have either a peripheral cutting edge 17 or a side cutting edge 18 or both, depending on the use to which the cutter is to be placed. Both cutting edges are provided in the present case to suit the cutter to use in the cutting of keyways and the like and, as shown in Fig. 2, the teeth are arranged in staggered relation so that the side cutting edges 18 of alternate teeth are disposed at one side, while the side cutting edges of the intermediate teeth are disposed at the other side of the cutter. The lateral displacement of the two sets of teeth obviously determines the width of the keyway or slot to be cut. Inserted in the slots with the teeth 16 are wedges 19 arranged to lock the teeth in place. The slots 14 are preferably, although not necessarily, slightly tapered inwardly to afford the desired wedging action when the wedges 19 are driven home. If desired, the wedging action may be afforded by properly conforming the coacting sides of the wedges and teeth in a manner believed to be self-evident.

According to the present invention, each of the wedges 19 are corrugated or serrated longitudinally on both sides, as shown at 20, to match the corrugations or serrations 21 and 21' extending lengthwise of the one side of the slot and the front of the tooth respectively. The teeth 16 are likewise serrated transversely on the back thereof, as shown at 22, to match the transverse corrugations 23 provided on the corresponding side of the slot 14. Thus, there are longitudinal serrations to protect against sidewise displacement of the teeth in the slots and transverse serrations to protect against endwise displacement. The teeth are, therefore, positively locked against displacement to withstand the end thrust where the peripheral cutting edges are used and likewise withstand the side thrust in the case of the side cutting edges being used. The longitudinal serrations are substantially at right angles to the transverse serrations so that the driving home of the wedges cannot possibly affect the setting of the teeth laterally, as might otherwise be the case if the force applied by the wedges had a lateral component relative to the teeth. The provision of the longitudinal and transverse serrations is principally for the purpose of allowing both endwise and sidewise adjustment of the cutting teeth so that the cutting diameter may be increased or diminished and the width of cut may be similarly varied by the offsetting of the teeth in staggered relation in the manner above referred to. I prefer to provide the transverse serrations inclined with respect to the axis of rotation of the cutter body in a predetermined relation to the cutting edges of the teeth. I have shown in Figs. 4 and 6 how the transverse serrations for two adjoining slots have opposite inclination, accordingly as the teeth for said slots are to have their side cutting edges at one or the other side of the cutter body. It will be observed by reference to Fig. 4 that the serrations 23 are inclined toward the side at which the side cutting edge of the tooth is presented. In the next slot of the cutter body, the transverse serrations are inclined toward the other side of the cutter body because the tooth in that slot has its side cutting edge presented on the other side of the cutting body. Thus, in adjusting a tooth by movement thereof in the serrations, as, for example, when compensating for wear, the tooth will be adjusted both sidewise and endwise. If this adjustment is not sufficient, the tooth may be stepped up one or more serrations and any desired setting as regards sidewise adjustment may be made. In certain cases as, for example, where the cutter is to be used for side cutting only as, for instance, in facing off work, the transverse serrations of the cutter body may be inclined away from the side cutting edges of the teeth so that the lateral thrust on the tooth may be assumed by the serrations. The angle of inclination of the transverse serrations relative to the axis of rotation of the cutter body may obviously be varied to suit any given requirements. In conclusion, it will be noted that under all circumstances the longitudinal serrations are always provided substantially at right angles to the transverse serrations for the reason above specified.

It is believed that the foregoing description makes the operation of my invention sufficiently clear that anyone skilled in this art could use the same to good advantage, the inserted tooth type of cutter having been employed in various forms in the past. By reason of the present refinements in design and construction I have provided a cutter wherein the teeth may be more readily adjusted and have a much wider range of adjustability than could be secured with certain other types of cutters with which I am familiar. At the same time this cutter may be produced at substantially the same cost as these other types referred to and, by reason of the increased range of adjustability of the cutting teeth, a considerable saving in the cost of maintenance is secured as the teeth are not rendered unfit for further use after they have become slightly worn as was otherwise the case. It will be understood that the present construction is capable of a considerable range of variation without sacrificing the more important advantages referred to and without departing seriously from the spirit and scope of the invention as defined by the appended claims.

I claim:

1. A cutter comprising in combination a body having slots provided therein opening at the periphery thereof, cutting teeth inserted in said slots, and wedges also inserted therein alongside said teeth to lock the same in place, the surface of each tooth and the corresponding surface of each slot being provided with transverse serrations arranged to be interengaged, the said transverse serrations being inclined with respect to the axis of rotation of the cutter body toward one side of the tooth arranged to serve as a cutting edge, and both surfaces of the wedge being provided with serrations extending lengthwise with respect to the slot and tooth and interengaging with serrations provided in the surfaces afforded by one side of the slot and one side of the tooth abutting said wedge, the said longitudinal serrations being substantially at right angles to the transverse serrations.

2. A cutter comprising in combination a body having slots provided therein opening at the periphery thereof, cutting teeth inserted in said slots, and wedges also inserted therein alongside said teeth to lock the same in place, the surface of each tooth and the corresponding surface of each slot being provided with transverse serrations arranged to be interengaged, the said transverse serrations being inclined relative to the axis of rotation of the cutter body in a certain direction with respect to one side of the tooth arranged to serve as a cutting edge, and both surfaces of the wedge being provided with serrations extending lengthwise with respect to the slot and tooth and interengaging with serrations provided in the surfaces afforded by one side of the slot and one side of the tooth abutting said wedge, the said longitudinal serrations being substantially at right angles to the transverse serrations.

3. A cutter comprising in combination a body having slots provided therein opening at the periphery thereof, cutting teeth inserted in said slots, and wedges also inserted therein alongside said teeth to lock the same in place, the surface of each tooth and the abutting surface of each slot being provided with transverse serrations arranged to be interengaged, the said transverse serrations being inclined relative to the axis of rotation of the cutter body in a certain direction with respect to one side of the tooth arranged to serve as a cutting edge, and one surface of each wedge and the surface abutting therewith being provided with longitudinal serrations arranged to be interengaged, the said longitudinal serrations being substantially at right angles to the transverse serrations.

In witness of the foregoing I affix my signature.

E. NORMAN ERICSON.